United States Patent
Taguchi et al.

(10) Patent No.: US 7,224,405 B2
(45) Date of Patent: May 29, 2007

(54) HORIZONTAL CONTOUR CORRECTION CIRCUIT

(75) Inventors: Hiroyuki Taguchi, Isesaki (JP); Nobuhiko Omori, Gunma-ken (JP); Kouichiro Yanagi, Himeji (JP)

(73) Assignee: Sanyo Electric Co., Ltd., Osaka (JP)

( * ) Notice: Subject to any disclaimer, the term of this patent is extended or adjusted under 35 U.S.C. 154(b) by 502 days.

(21) Appl. No.: 10/932,570

(22) Filed: Sep. 2, 2004

(65) Prior Publication Data

US 2005/0083438 A1 Apr. 21, 2005

(30) Foreign Application Priority Data

Sep. 2, 2003 (JP) ............................. 2003-310697

(51) Int. Cl.
H04N 5/00 (2006.01)
H04N 5/14 (2006.01)
H04N 5/21 (2006.01)
G06K 9/40 (2006.01)
G06K 9/48 (2006.01)

(52) U.S. Cl. ..................... 348/607; 348/26; 348/625; 382/199; 382/266

(58) Field of Classification Search ................ 348/26, 348/607, 625; 382/199, 266
See application file for complete search history.

(56) References Cited

U.S. PATENT DOCUMENTS 6,320,620 B1* 11/2001 Markandey et al. ......... 348/448
6,359,659 B1* 3/2002 Suzuki et al. ................ 348/625
6,433,836 B1* 8/2002 Suzuki et al. ................ 348/625
6,650,792 B1* 11/2003 Aida et al. ................... 382/298
6,650,972 B1* 11/2003 Robinson et al. ............... 701/3
6,897,897 B2* 5/2005 Mise et al. ................... 348/252
6,909,813 B2* 6/2005 Amano et al. ................ 382/266
6,980,258 B1* 12/2005 Matsunaga ................... 348/625

FOREIGN PATENT DOCUMENTS

JP 2000-59650 2/2000
JP 2000-115584 4/2000

OTHER PUBLICATIONS

English Patent Abstract for 2000-59650 from esp@cenet, published Feb. 25, 2000.
English Patent Abstract for 2000-115584 from esp@cenet, published Apr. 21, 2000.

* cited by examiner

*Primary Examiner*—Brian P. Yenke
(74) *Attorney, Agent, or Firm*—Osha Liang LLP

(57) ABSTRACT

A horizontal contour correction circuit for correcting a horizontal contour of a video signal to output as a corrected signal, comprising: a delay circuit for outputting video signal values of a video signal at at least three different times either before or after a reference time, the video signal containing video signal values being input in a time serial manner; a plurality of selection circuits each for combining video signal values selected in advance from a group of video signal values output from the delay circuit, and selecting one video signal value from each combination of the video signal values to output; and a switch circuit for selecting one video signal value from among the video signal values output from the plurality of selection circuits. The video signal values before and after the reference time are respectively subtracted from a video signal value at the reference time, whereby horizontal contour of a video signal is corrected.

6 Claims, 15 Drawing Sheets

| S INPUT | R INPUT | Qn+1 OUTPUT |
|---------|---------|-------------|
| 0 | 0 | Qn |
| 0 | 1 | 0 |
| 1 | 0 | 1 |
| 1 | 1 | PROHIBITED |

| PATTERN NUMBER | JUDGMENT SIGNAL S | CONTROL SIGNAL C1 | CONTROL SIGNAL C2 | SELECTION CIRCUIT 34a OUTPUT | SELECTION CIRCUIT 34b OUTPUT | SELECTION CIRCUIT 34c OUTPUT | SELECTION CIRCUIT 34d OUTPUT | SWITCH CIRCUIT 36a OUTPUT | SWITCH CIRCUIT 36b OUTPUT |
|---|---|---|---|---|---|---|---|---|---|
| 1 | L | L | L | Toa | Tob | Tod | Toe | Tob | Tod |
| 2 | L | L | H | Toa | Tob | Tod | Toe | Tob | Toe |
| 3 | L | H | L | Toa | Tob | Tod | Toe | Toa | Tod |
| 4 | L | H | H | Toa | Tob | Tod | Tof | Toa | Toe |
| 5 | H | L | L | Tia | Toa | Toe | Tof | Toa | Toe |
| 6 | H | L | H | Tia | Toa | Toe | Tof | Toa | Tof |
| 7 | H | H | L | Tia | Toa | Toe | Tof | Tia | Toe |
| 8 | H | H | H | Tia | Toa | Toe | Tof | Tia | Tof |

Fig. 5

HORIZONTAL CONTOUR CORRECTION CIRCUIT

CROSS-REFERENCE TO RELATED APPLICATIONS

The entire disclosure of Japanese Application No. 2003-310697 including specification, claims, drawings and abstract is incorporated herein by reference in its entirety.

BACKGROUND OF THE INVENTION

1. Field of the Invention

The present invention relates to a horizontal contour correction circuit for applying horizontal contour correction of an image to a video signal for a television display device or the like.

2. Description of the Related Art

Video display devices for displaying analogue video signals on CRTs by means of electronic beam scanning and those for displaying digitized video signals on liquid crystal or plasma displays having fixed pixels are available. Such a video display device comprises a circuit for applying horizontal contour correction for adjusting image sharpness.

FIG. 9 shows a horizontal contour correction circuit 100 for correcting a horizontal contour of a digitized video signal being input in a time serial manner. The shown horizontal contour correction circuit 100 is the one having the simplest structure among general horizontal contour correction circuits, specifically having two serially connected memories 10a and 10b and an operation circuit 12.

The memories 10a and 10b are serially connected, and a video signal to be subjected to horizontal correction is input into an input terminal $T_{ia}$ in a time serial manner. Every receipt of a reset signal, the memories 10a and 10b capture, and store therein, pixel data via the respective input terminals $T_i$ and output pixel data held therein via the respective output terminals $T_o$.

Video signals being time serially input via the input terminal $T_{ia}$ of the memory 10a are sequentially transferred for every pixel from the output terminal $T_{oa}$ of the memory 10a to the output terminal $T_{ob}$ of the memory 10b. Provided that a value output from the output terminal $T_{oa}$ is a reference value at a reference time, a value output from the input terminal $T_{ia}$ is of pixel data which is input after the reference time by an amount of time corresponding to a single pixel, and a value output from the output terminal $T_{ob}$ is pixel data which is input before the reference time by an amount of time corresponding to a single pixel.

An operation circuit 12 receives outputs from the input terminal $T_{ia}$ and output terminal $T_{oa}$ of the memory 10a and also from the output terminal $T_{ob}$ of the memory 10b, and executes an operation using the received outputs. Specifically, values output from the input terminal $T_{ia}$ and output terminal $T_{ob}$ are subtracted from an output value from the output terminal $T_{oa}$, which is assumed as a reference value, and the operation result is output as a result of horizontal contour correction.

FIG. 10 shows a frequency characteristic to be exhibited as a result of horizontal contour correction using the horizontal contour correction circuit 100. In the drawing, the abscissa indicates normalized frequency, while the ordinate indicates an attenuation amount according to a frequency.

FIG. 11 shows a horizontal contour correction circuit 102. The shown horizontal contour correction circuit 102 has an identical structure to that of the circuit of FIG. 9, except that it has four serially connected memories 10a to 10d.

The operation circuit 12 receives values output from the input terminal $T_{ia}$ of the memory 10a, the output terminal $T_{ob}$ of the memory 10b, and the output terminal $T_{od}$ of the memory 10d. The operation circuit 12 subtracts values of the input terminal $T_{ia}$ and the output terminal $T_{od}$ from a value of the output terminal $T_{ob}$ of the memory 10b, or a reference value, and outputs the result of the operation. FIG. 12 shows frequency characteristic of the horizontal contour correction circuit 102.

As described above, an operation using desirably selected pixel data which is available before and after a reference time, enables formation of horizontal contour correction circuits having a variety of frequency characteristics.

Moreover, when selection circuits 14a and 14b, including a switch, are provided, as shown in FIG. 13, so as to desirably switch, and output, pixel data inputted thereto, a horizontal contour correction circuit capable of selecting different frequency characteristics can be formed.

Further, when a selection control circuit 16 is additionally provided to output a judgment signal S to the selection circuits 14a and 14b based on the absolute value and/or variation of a reference value, outputs from the selection circuits 14a and 14b can be automatically switched based on the judgment signal S. This arrangement enables automatic shift to an appropriate frequency characteristic.

Despite the features described above, in an attempt to further increase the number of frequency characteristics available, additional memories 20e to 20f are required, as shown in the horizontal contour correction circuit 200 of FIG. 14, so that data to use in an operation can be selected from among a plurality of pixel data. Accordingly, the selection circuits 24a and 24b are required to be modified so as to have a multi-contact switch.

Further, in order to achieve automatic selection using the selection control circuit 26, a complicated determination algorithm is required as one item of pixel data must be selected from among a plurality of pixel data and a judgment signal S of many values must be output.

Still further, a mechanism for switching the multi-contact switch of the selection circuits 24a and 24b based on the judgment signal S is also required. This results in an expensive control circuit having a complicated structure.

SUMMARY OF THE INVENTION

According to one aspect of the present invention, there is provided a horizontal contour correction circuit for correcting a horizontal contour of a video signal to output as a corrected signal, comprising:

a delay circuit for outputting video signal values of a video signal at at least three different times either before or after a reference time, the video signal containing video signal values being input in a time serial manner;

a plurality of selection circuits each for combining video signal values selected in advance from a group of video signal values output from the delay circuit, and selecting one video signal value from each combination of the video signal values to output; and a switch circuit for selecting one video signal value from among the video signal values output from the plurality of selection circuits;

wherein the video signal values before and after the reference time are respectively subtracted from a video signal value at the reference time, whereby the corrected signal is output.

According to another aspect of the present invention, there is provided a horizontal contour correction circuit for correcting a horizontal contour of a video signal to output as a corrected signal, comprising:

a delay circuit comprising a plurality of serially connected delay elements each for delaying video signal values received via an input terminal thereof by a predetermined amount of time before outputting via an output terminal thereof;

a plurality of selection circuits each for combining video signal values extracted from the input or output terminals of the delay elements, and selecting one video signal value from each combination of the video signal values to output; and a switch circuit for selecting one video signal value from among video signal values output from the plurality of selection circuits, wherein a reference time is determined with respect to the video signal containing video signal values being input in a time serial manner, and the video signal values before and after the reference time are respectively subtracted from a video signal value at the reference time, whereby a corrected signal corresponding to the video signal having horizontal contour corrected is output.

BRIEF DESCRIPTION OF THE DRAWINGS

Preferred embodiments of the present invention will be described in further detail based on the following drawings, wherein:

FIG. 5 is a table showing correlation between inputs and outputs relative to the horizontal contour correction circuit in the embodiment of the present invention;

DESCRIPTION OF THE PREFERRED EMBODIMENTS

Figure 1:
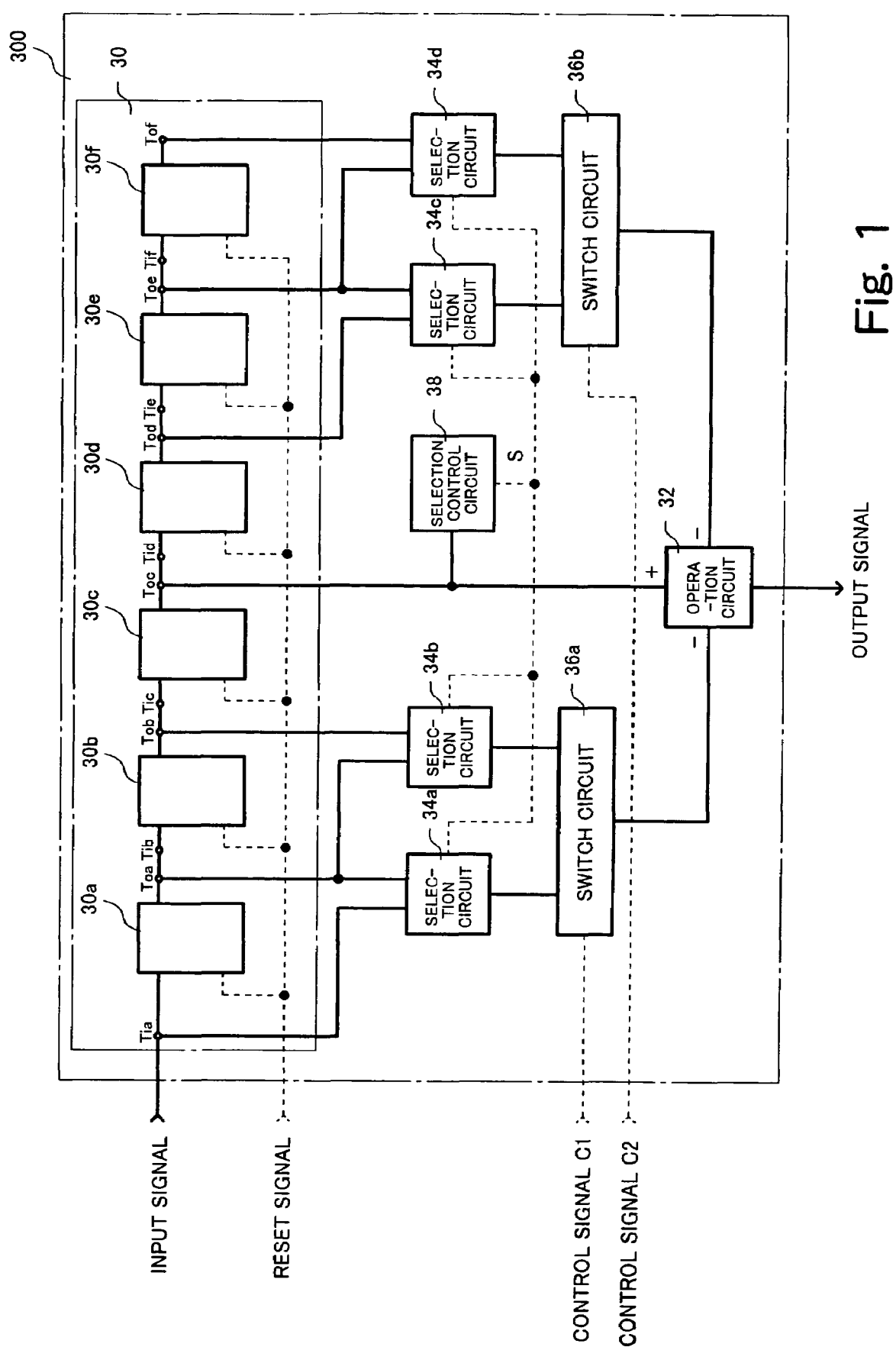
FIG. 1 is a block diagram showing a circuit structure of a horizontal contour correction in a first embodiment of the present invention.

FIG. 1 shows a horizontal contour correction circuit 300 in a first embodiment of the present invention. The horizontal contour correction circuit 300 comprises a delay circuit 30 (memories 30a to 30f), an operation circuit 32, selection circuits 34a to 34d, switch circuits 36a and 36b, and a selection control circuit 38. In the following, the horizontal contour correction circuit 300 is described with reference to a timing chart of FIG. 2.

The delay circuit 30 comprises memories 30a to 30f in serial connection. Data on each pixel of a video signal to be subjected to horizontal correction is input in a time serial manner, that is, at time $t_0$, $t_1$, $t_2$ . . . , into the input terminal $T_{ia}$. Pixel data of a video signal may be a luminous or chrominance signal.

Each of the memories 30a to 30f may have a number of flip-flop circuits corresponding to the number of bits for representing data on a single pixel. For example, if a luminance signal of a video signal is such that data on a single pixel is expressed using eight bits, the memories 30a to 30f each include flip-flop circuits for eight bits.

Figures 3A, 3B:
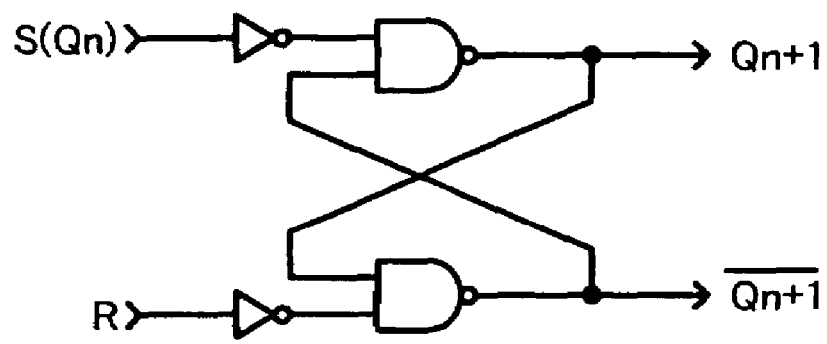
FIG. 3A is a diagram showing a structure of a flip-flop circuit which can constitute a delay circuit in an embodiment of the present invention.
FIG. 3B is a truth table showing correlation between inputs and outputs for the flip-flop circuit shown in FIG. 3A.

As shown in FIG. 3A, a flip-flop circuit holds values at an output terminal $Q_{n+1}$ and a reversed output terminal $\overline{Q_{n+1}}$ (barred) depending on the states of the set terminal S (Qn) and the reset terminal R. Specifically, as shown in FIG. 3B, when the value "0" is kept input to the reset terminal R and an output Qn of the one-stage preceding flip-flop is input to the set terminal S, an output Qn is continuously output from the output terminal $Q_{n+1}$ until the value input to the reset terminal R is changed to "1".

Each of the memories 30a to 30f receives, and stores or holds therein, pixel data which is input via an input terminal $T_i$ every input of a reset signal to the reset terminal R, and outputs pixel data held therein via the output terminal $T_o$. That is, each of the memories 30a to 30f functions as a delay element for delaying a digitized video signal for every pixel.

Figure 2:
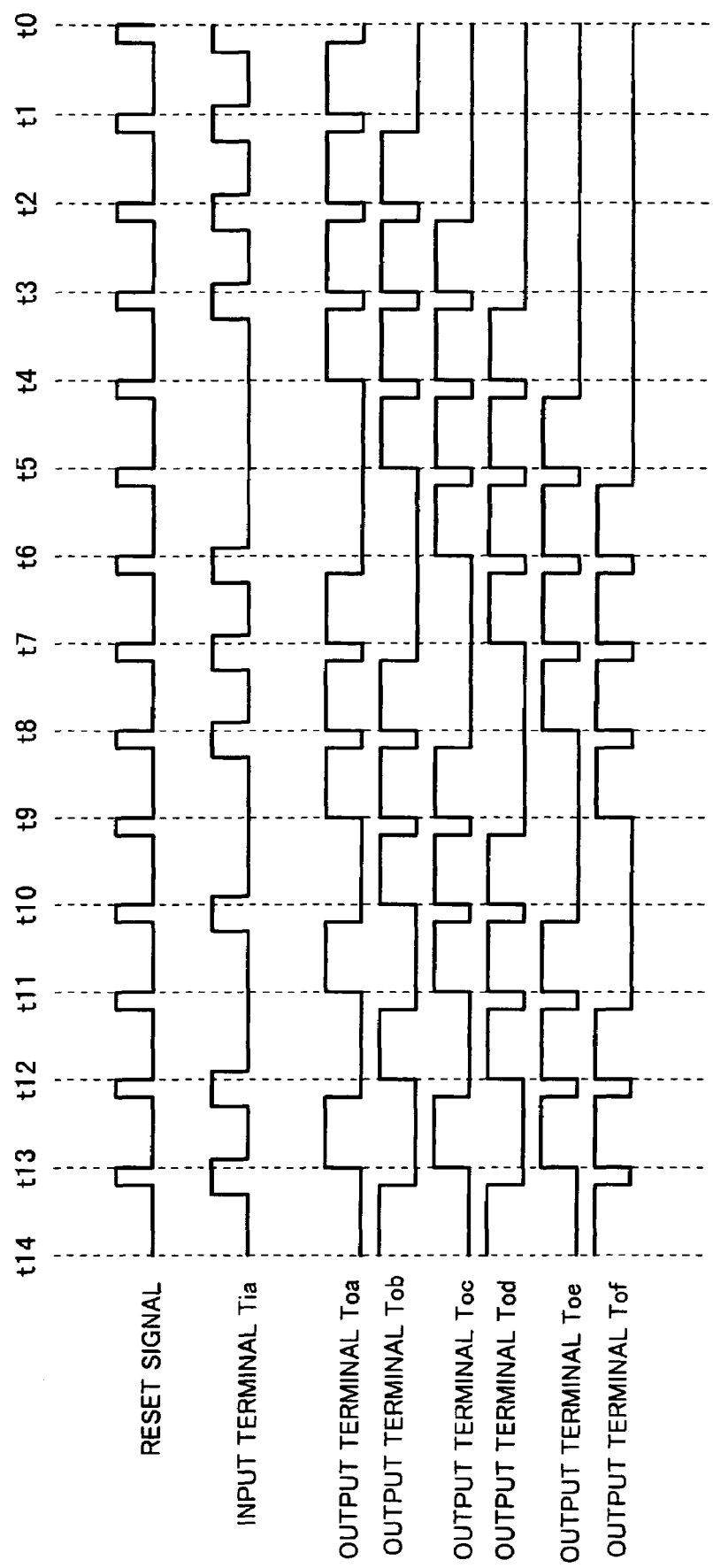
FIG. 2 is a timing chart for a delay circuit (a memory) in the first embodiment of the present invention.

As shown in FIG. 2, video signal values of a video signal, which are time serially input via the input terminal $T_{ia}$ of the memory 30a, are sequentially transferred for every pixel from the output terminal $T_{oa}$ of the memory 30a to the output terminal $T_{of}$ of the memory 30f.

For example, assuming that a video signal value at the output terminal $T_{oc}$ is a reference value at a reference time, a value at the output terminal $T_{ob}$ is of pixel data which is input into the input terminal $T_{ia}$ after the reference time by an amount of time corresponding to pixel data for a single pixel, while a video signal value at the output terminal $T_{od}$ is of pixel data which is input into the input terminal $T_{ia}$ before the reference time by an amount of time corresponding to pixel data for a single pixel. That is, pixel data on a video signal at least three or more different times before or after the reference time are output from the delay circuit 30.

The selection control circuit 38 receives one of the outputs from the memories 30a to 30f as a reference value at a reference time, and, based on the received reference value, outputs a judgment signal S for setting frequency characteristic of the horizontal contour correction circuit 300.

In this embodiment, the value at the output terminal $T_{oc}$ of the memory 30c is received as a reference value, and a judgment signal S is determined based on the absolute value and time variation of the reference value. The judgment signal S is output as a signal at either an H or L level, and supplied to the selection circuits 34a to 34d.

The selection circuits 34a to 34d each select, and output, a single video signal value selected from a predetermined combination of pixel data out of a group of pixel data output from the delay circuit 30. Specifically, the selection circuits 34a to 34d each receive a judgment signal S from the selection control circuit 38, and select and output one of the two signals input thereto.

Figure 4:
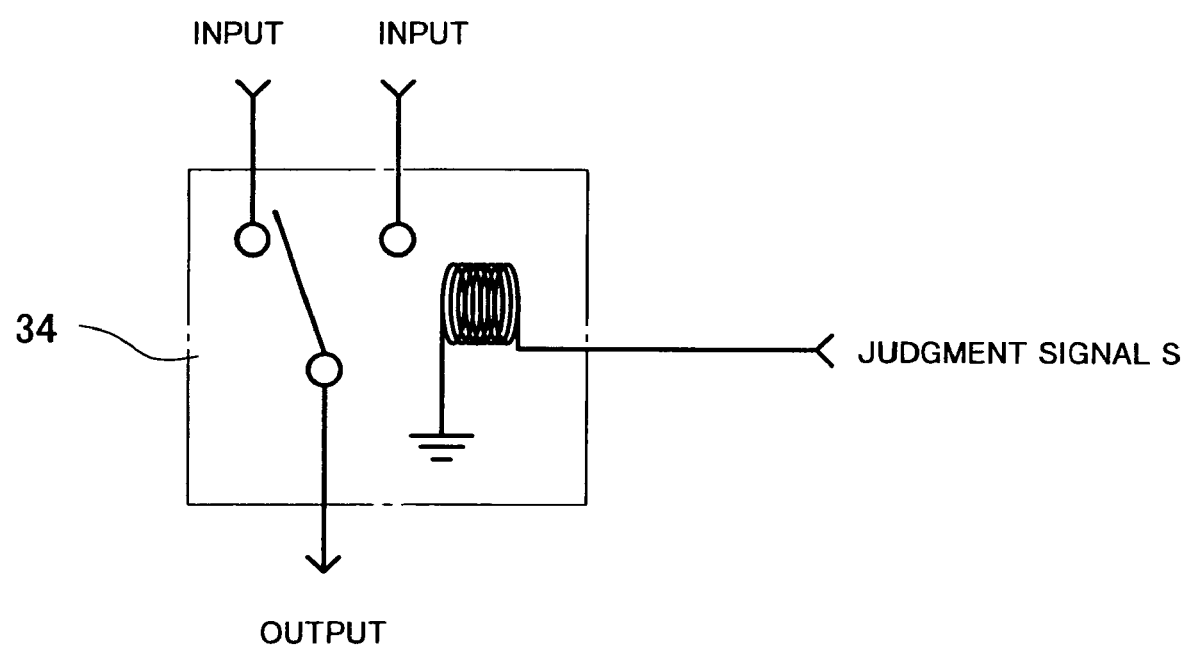
FIG. 4 is a diagram showing a structure of a relay circuit which can constitute a selection circuit in an embodiment of the present invention.

The selection circuits 34a to 34d may each be formed using a relay circuit, as shown in FIG. 4, which switches two input terminals so that one of the two input terminals is coupled to the output terminal, depending on the level of the judgment signal S, that is, whether an H or L level, to supply to an output terminal.

In this embodiment, the input terminal $T_{ia}$ and output terminal $T_{oa}$ of the memory 30a are coupled to the input terminal of the selection circuit 34a; the output terminal $T_{oa}$ of the memory 30a and the output terminal $T_{ob}$ of the memory 30b are coupled to the input terminal of the selection circuit 34b; the output terminal $T_{od}$ of the memory 30d and the output terminal $T_{oe}$ of the memory 30e are coupled to the input terminal of the selection circuit 34c; and the output terminal $T_{oe}$ of the memory 30e and the output terminal $T_{of}$ of the memory 30f are coupled to the input terminal of the selection circuit 34d.

Outputs from the selection circuits 34a and 34b are supplied to the switch circuit 36a, while outputs from the selection circuits 34c and 34d are supplied to the switch circuit 36b. The switch circuit 36a selects, for output, one output from among the outputs from the selection circuits 34a and 34b, while the switch circuit 36b selects, for output, one output from among the outputs from the selection circuits 34c and 34d.

The switch circuits 36a and 36b are each formed using a switch for selectively outputting one signal out of the signals input thereto respectively in response to the control signals C1 and C2, which are supplied from the outside of the horizontal contour correction circuit 300. Control signals C1 and C2 may preferably be supplied, and set, from the outside of the horizontal contour correction circuit 300 irrespective of the result of judgment by the selection control circuit 38.

For example, the control signals C1 and C2 may be manually set in advance based on a frequency characteristic which is desired to be obtained in the horizontal contour correction circuit 300. Alternatively, the control signals C1 and C2 may be set automatically based on a frequency characteristic required by the horizontal contour correction circuit 300, which is determined using an external circuit.

As shown in FIG. 5, for example, values to be output from the selection circuits 34a to 34d and from the switch circuits 36a and 36b can be selected based on combination of a judgment signal S and control signals C1 and C2.

The operation circuit 32 executes an operation by subtracting the values of pixel data before and after a reference time, which are output from the switch circuits 36a and 36b, respectively, from the value of pixel data at a reference time, which is output from the output terminal Toc of the memory 30c of the delay circuit 30. This execution yields a corrected signal which corresponds to a video signal having a corrected horizontal contour. The horizontal contour correction circuit 300 outputs a result of the execution as an output signal.

Figure 6A:
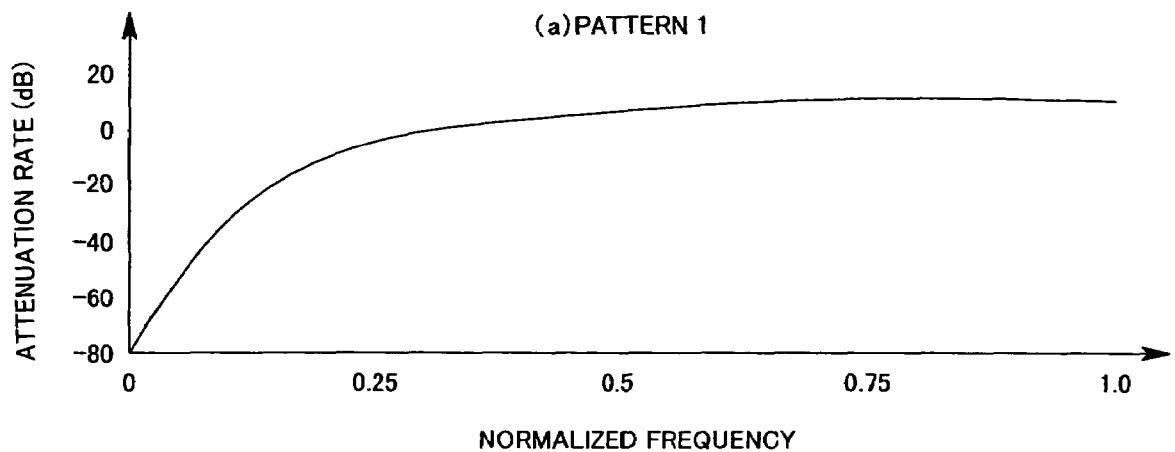
FIGS. 6A, 6B, and 6C are diagrams showing frequency characteristic of a horizontal contour correction circuit in the embodiment of the present invention.
Figure 6B:
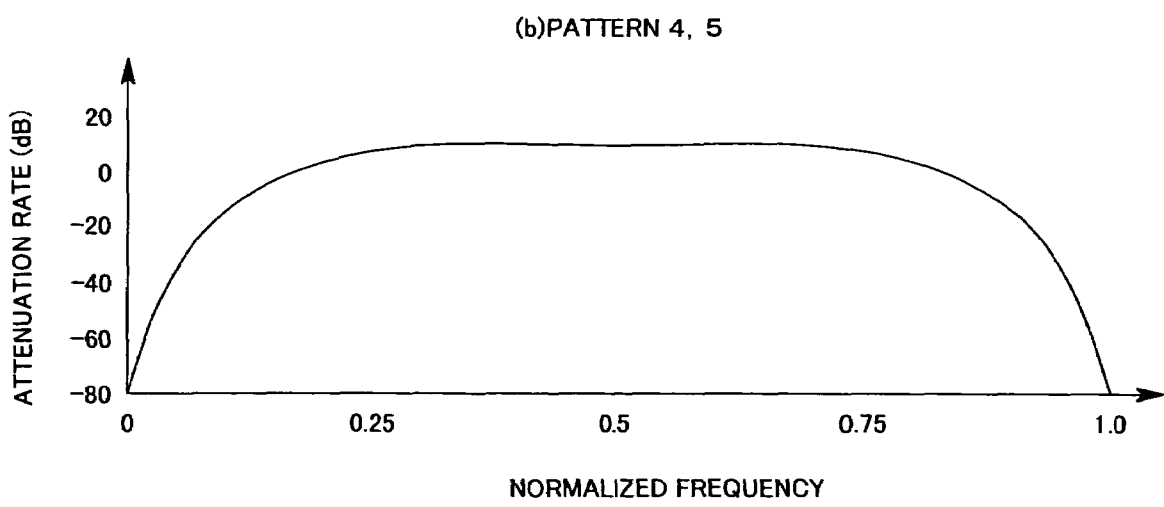
Figure 6C:
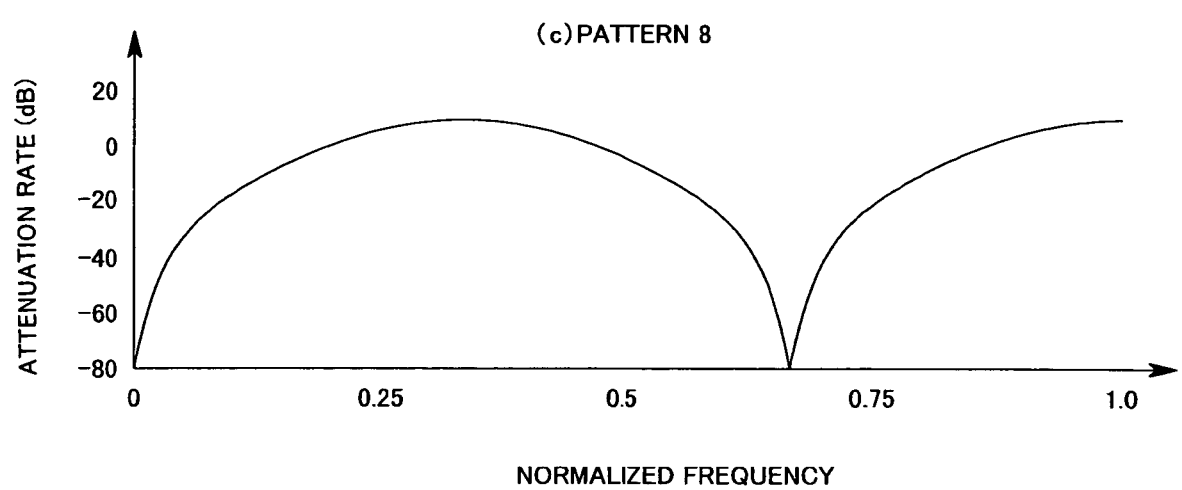

Specifically, horizontal contour correction can be attained using different frequency characteristics, as shown in FIGS. 6A, 6B, and 6C, depending on a pattern of combination of a judgment signal S and control signals C1 and C2, as shown in FIG. 5. It should be noted that, in FIGS. 6A to 6C, the abscissas indicates normalized frequency, while the ordinates indicates an attenuation amount of a signal.

As described above, the horizontal contour correction circuit 300 of the embodiment of the present invention can provide a variety of frequency characteristics available for selection, while avoiding a complicated circuit structure.

Specifically, the switch circuit 36a and 36b are provided so that two selection circuits are selected in advance from among the selection circuits 34a to 34d according to the externally supplied control signals C1 and C2. This arrangement makes it possible to select a desired frequency characteristic from among a plurality of frequency characteristics by outputting only a binary judgment signal at either an H or L level from the selection control circuit 38 based on the video signal value at the reference time.

As a result, it is no longer necessary to form the selection control circuit 38 as a circuit capable of outputting a many-value judgment signal, which contributes to simplification of the judgment algorithm.

Further, the selection circuits 34a to 34d can be formed as a simple relay circuit for selecting one of two inputs depending on the level of a judgment signal S, that is, at either H or L level.

Figure 7:
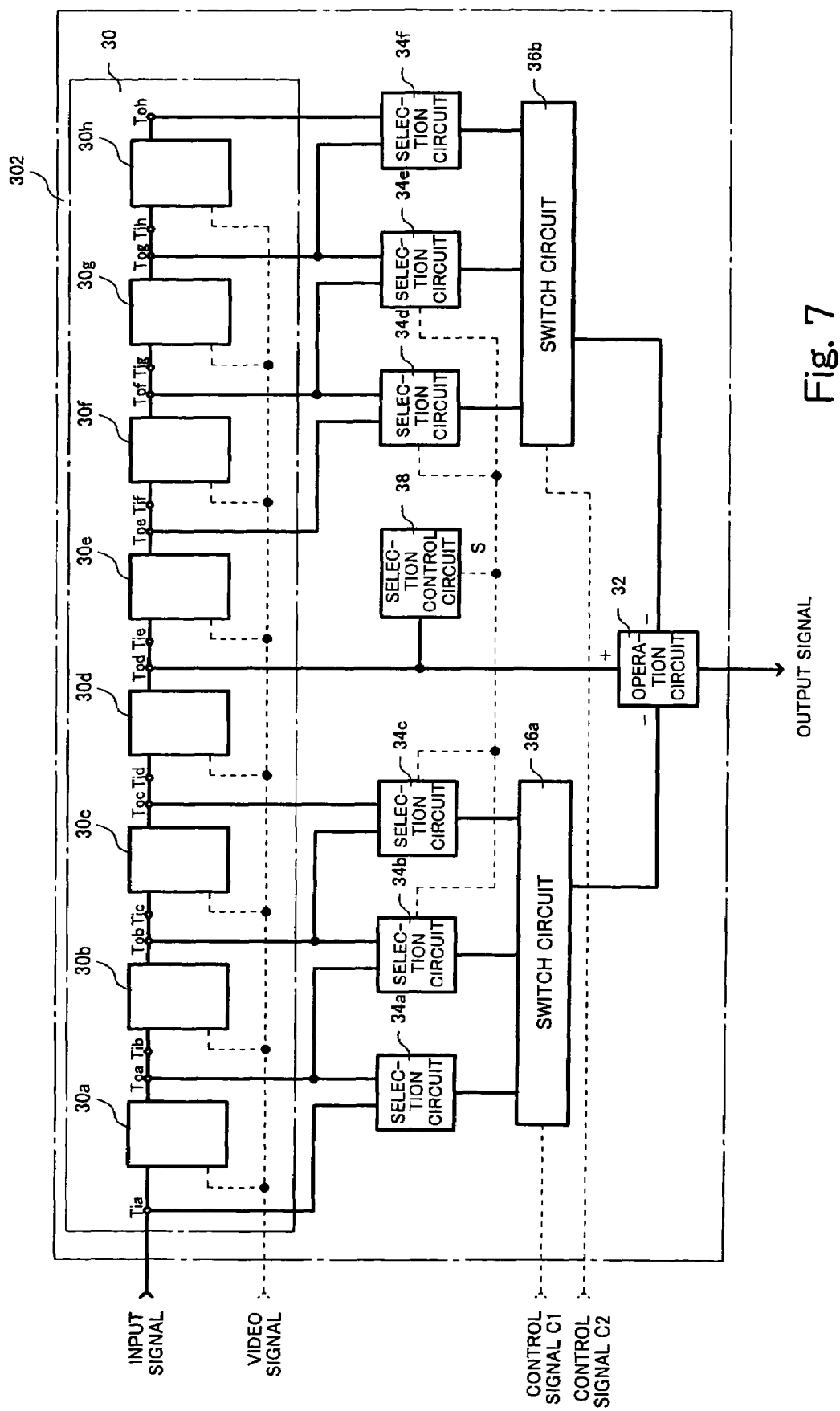
FIG. 7 is a block diagram showing another structure of a horizontal contour correction circuit in a second embodiment of the present invention.

FIG. 7 shows a horizontal contour correction circuit 302 in a second embodiment of the present invention. The horizontal contour correction circuit 302 has additional memories and selection circuits in order to increase the number of frequency characteristics available. In this case, similar to the above, any of the selection circuits 34 is preferably selected in advance by utilizing the switch circuit 36.

It should be noted that, although horizontal contour correction is applied to a digitized video signal in the above, the correction can be similarly applied to an analog video signal.

Figure 8:
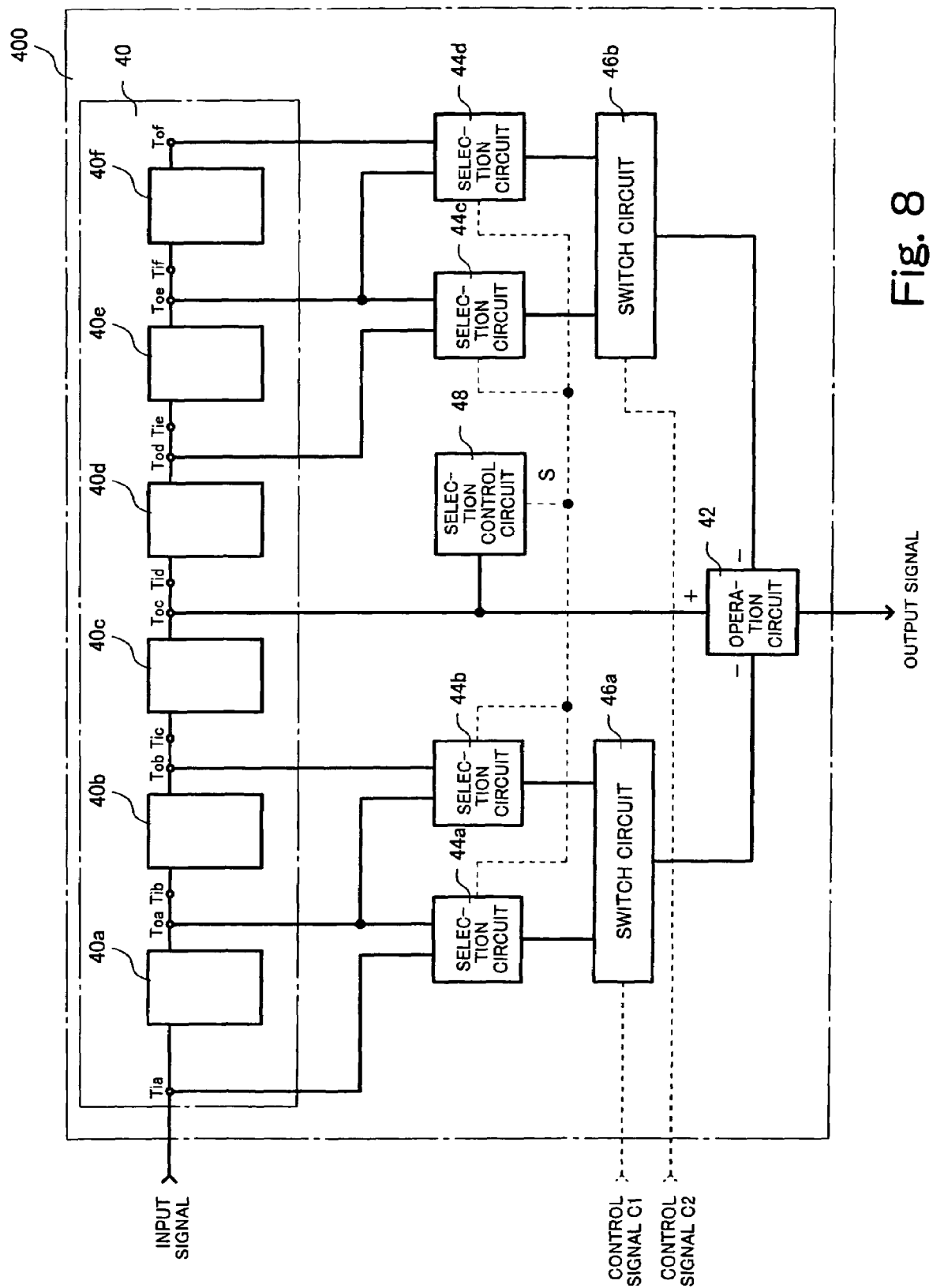
FIG. 8 is a block diagram showing a horizontal contour correction circuit for an analogue video signal in a third embodiment of the present invention.
Figure 9:
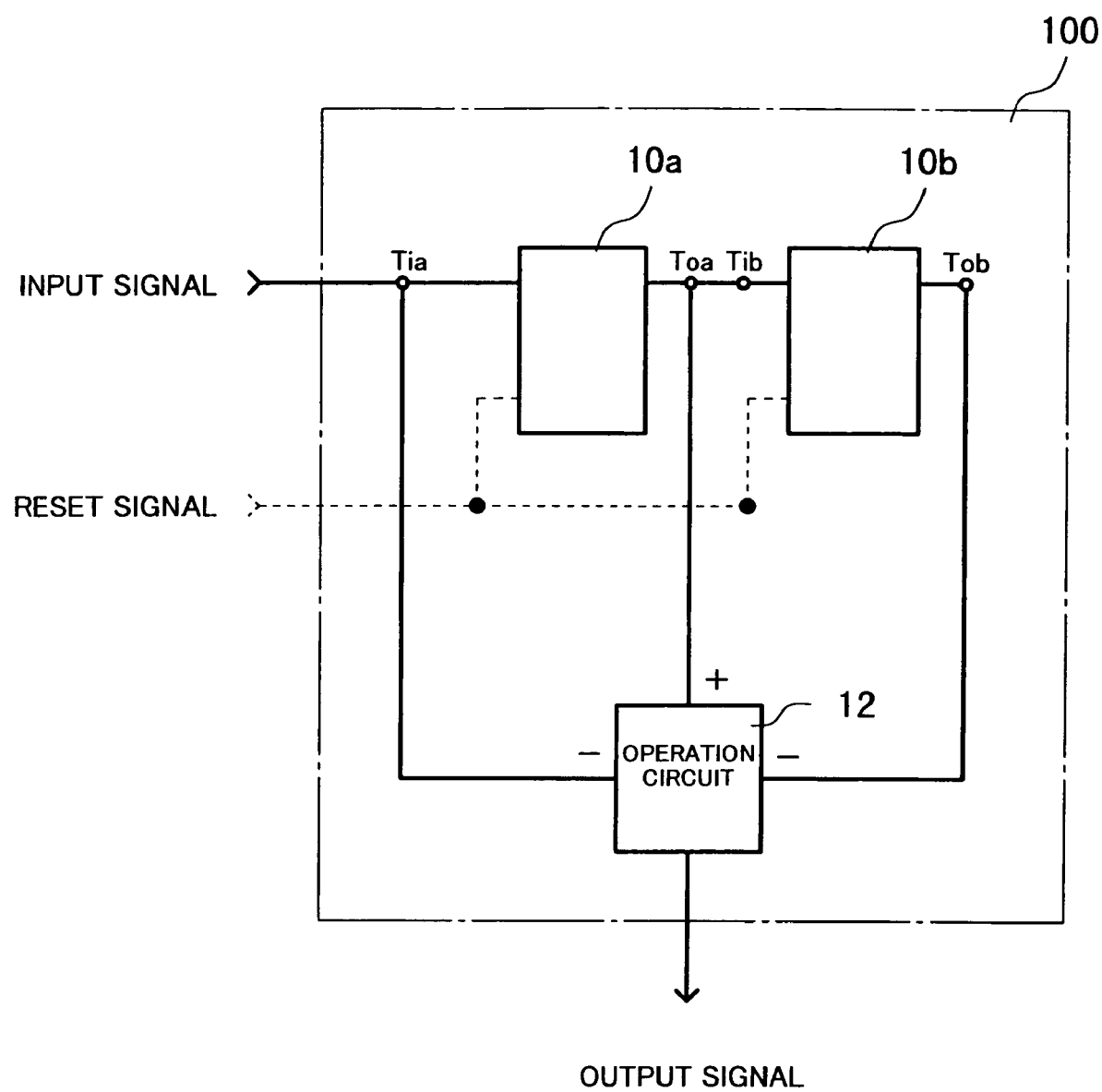
FIG. 9 is a block diagram showing a structure of a horizontal contour correction circuit according to related art.
Figure 10:
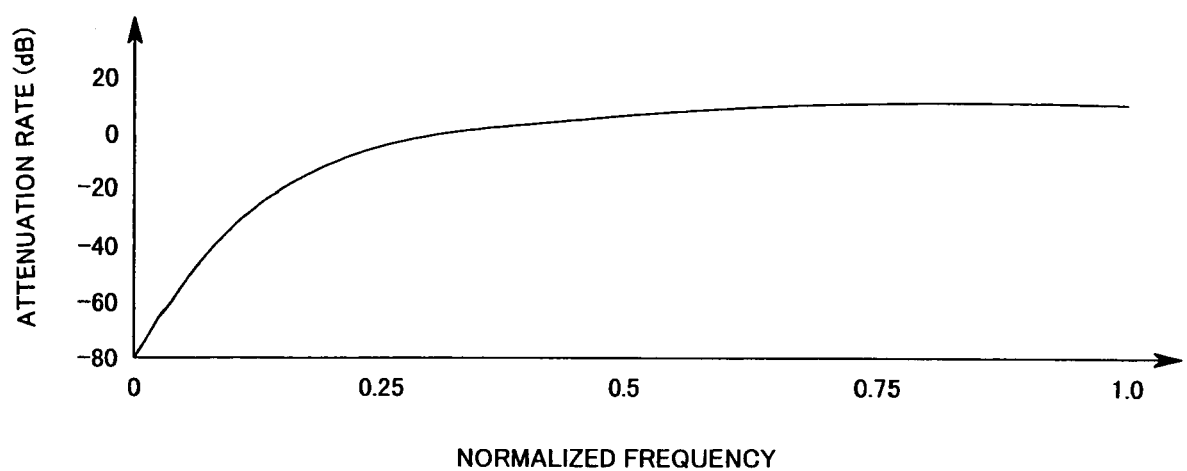
FIG. 10 is a diagram showing frequency characteristic of the horizontal contour correction circuit of FIG. 9.
Figure 11:
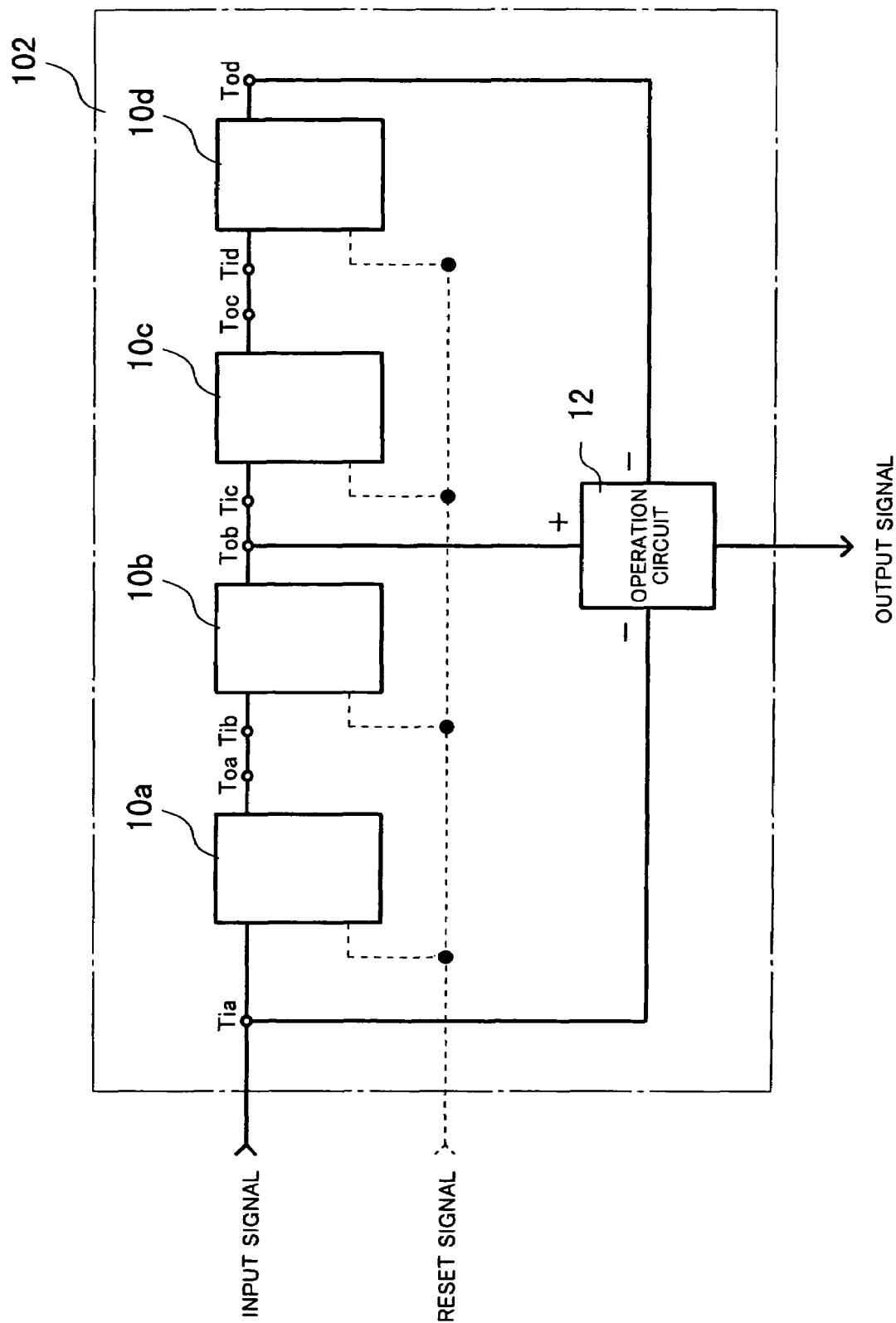
FIG. 11 is a block diagram showing another structure of a horizontal contour correction circuit according to related art.
Figure 12:
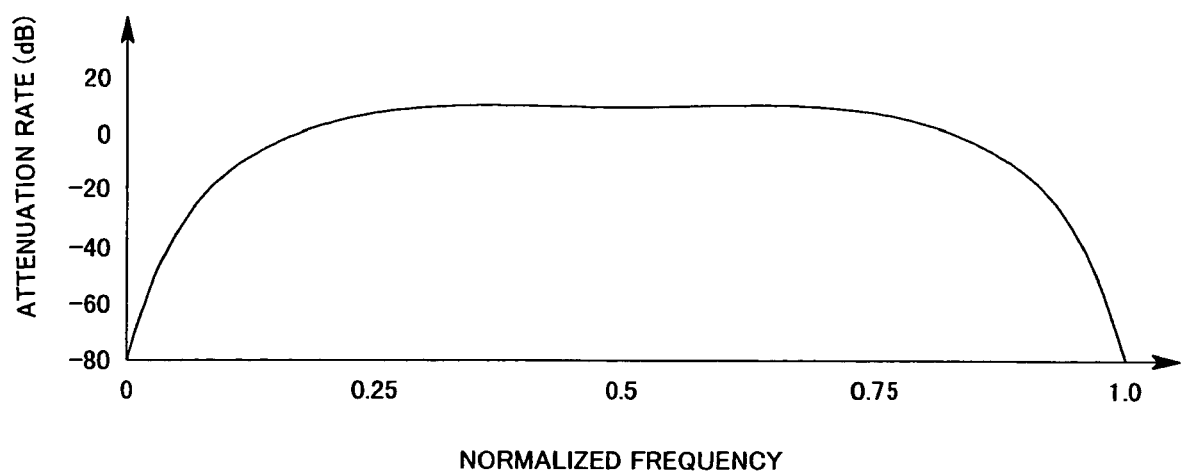
FIG. 12 is a diagram showing a frequency characteristic of the horizontal contour correction circuit of FIG. 11.
Figure 13:
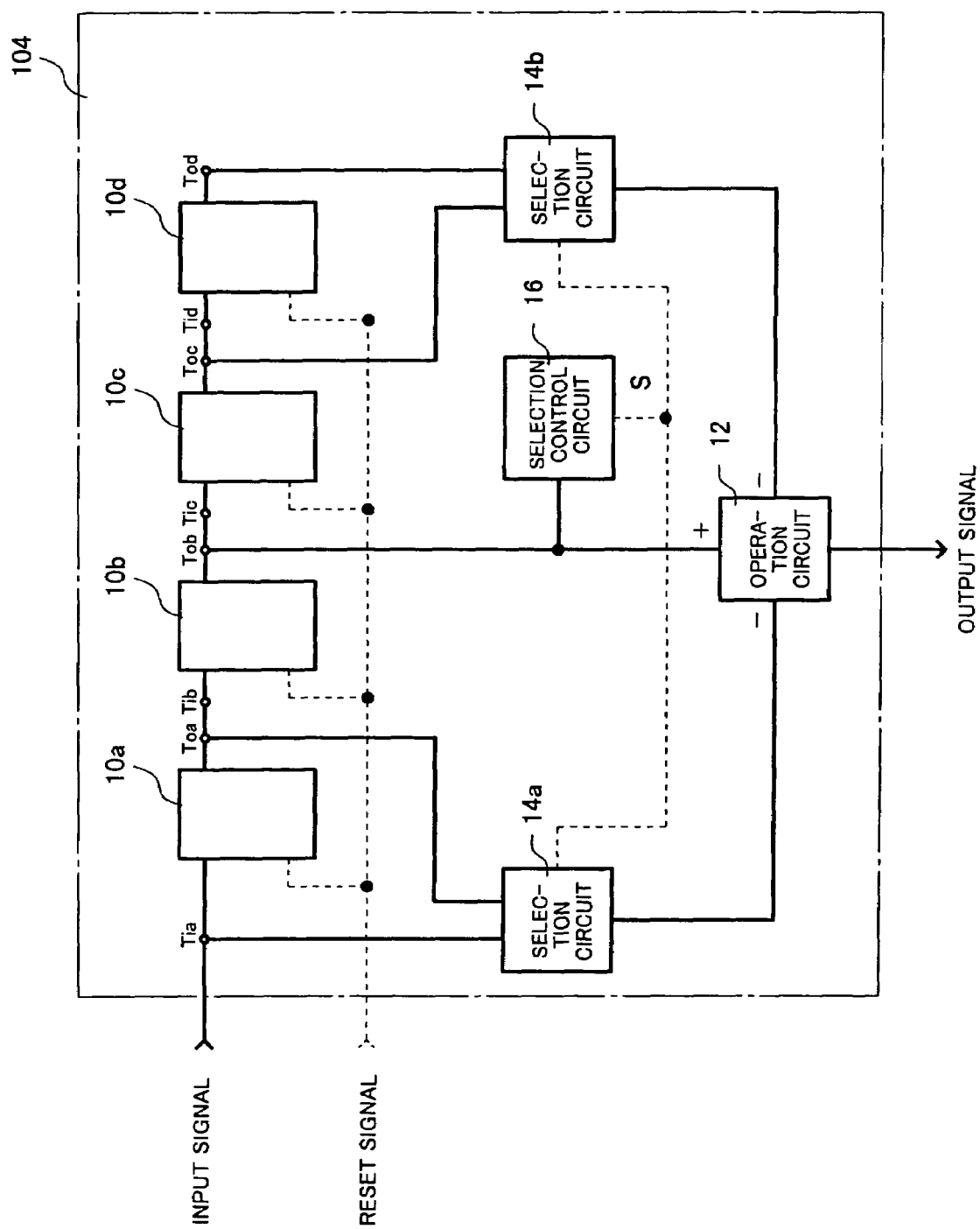
FIG. 13 is a block diagram showing a structure of a horizontal contour correction circuit capable of switching frequency characteristics according to related art.
Figure 14:
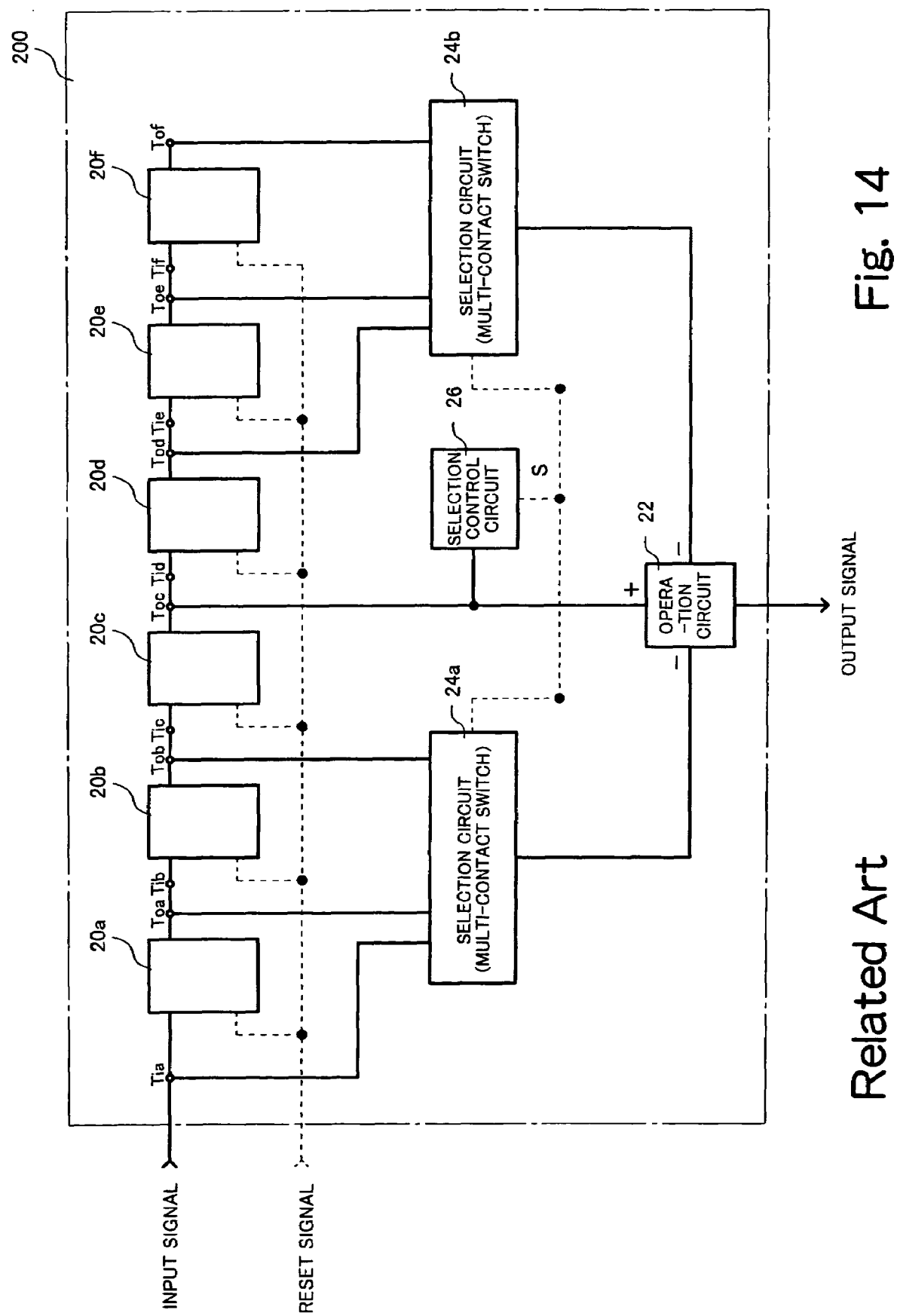
FIG. 14 is a block diagram showing another structure of a horizontal contour correction circuit capable of switching frequency characteristics according to related art.

FIG. 8 shows a horizontal contour correction circuit 400 in a third embodiment of the present invention, which can be appropriately used with an analog video signal. The horizontal contour correction circuit 400 comprises a delay circuit 40 (delay circuits 40a to 40f), an operation circuit 42, selection circuits 44a to 44d, switch circuits 46a and 46b, and a selection control circuit 48.

That is, the horizontal contour correction circuit 400 comprises delay elements 40a to 40f for delaying an analog video signal input via each input terminal $T_i$ by a predetermined amount of time before outputting via the terminal $T_o$. Use of the delay circuit 40, which comprises the serially connected delay circuits 40a to 40f, enables formation of a horizontal contour correction circuit 400 capable of changing frequency characteristic in a variety of ways, while avoiding a complicated structure.

It should be noted that the present invention is not limited to the above-described embodiments, and it will be appreciated that the present invention can be modified in a variety of ways without departing from the gist of the present invention and within the scope of the present invention.

What is claimed is:
1. A horizontal contour correction circuit for correcting a horizontal contour of a video signal to output as a corrected signal, comprising:
    a delay circuit for outputting video signal values of a video signal at at least three different times either before or after a reference time, the video signal containing video signal values being input in a time serial manner;

a plurality of selection circuits each for combining video signal values selected in advance from a group of video signal values output from the delay circuit, and selecting one video signal value from each combination of the video signal values for output; and a switch circuit for selecting one video signal value from among the video signal values output from the plurality of selection circuits;

wherein the video signal values before and after the reference time are respectively subtracted from a video signal value at the reference time, whereby the corrected signal is output.

2. The horizontal contour correction circuit according to claim 1, further comprising:

a selection control circuit for controlling selection of a video signal value by the selection circuit, based on the video signal value at the reference time.

3. The horizontal contour correction circuit according to claim 1, wherein the video signal is a luminance signal or a chrominance signal.

4. A horizontal contour correction circuit for correcting a horizontal contour of a video signal to output as a corrected signal, comprising:

a delay circuit comprising a plurality of serially connected delay elements each for delaying video signal values received via an input terminal thereof by a predetermined amount of time before outputting via an output terminal thereof;

a plurality of selection circuits each for combining video signal values extracted from the input or output terminals of the delay elements, and selecting one video signal value from each combination of the video signal values for output; and a switch circuit for selecting one video signal value from among video signal values output from the plurality of selection circuits, wherein a reference time is determined with respect to the video signal containing video signal values being input in a time serial manner, and the video signal values before and after the reference time are respectively subtracted from a video signal value at the reference time, whereby a corrected signal corresponding to the video signal having horizontal contour corrected is output.

5. The horizontal contour correction circuit according to claim 4, further comprising:

a selection control circuit for controlling selection of a video signal value by the selection circuit, based on the video signal value at the reference time.

6. The horizontal contour correction circuit according to claim 4, wherein the video signal is a luminance signal or a chrominance signal.

* * * * *